G. H. HERRICK.
SPRING HUB FOR VEHICLE WHEELS.
APPLICATION FILED OCT. 23, 1911.
1,044,524.
Patented Nov. 19, 1912.
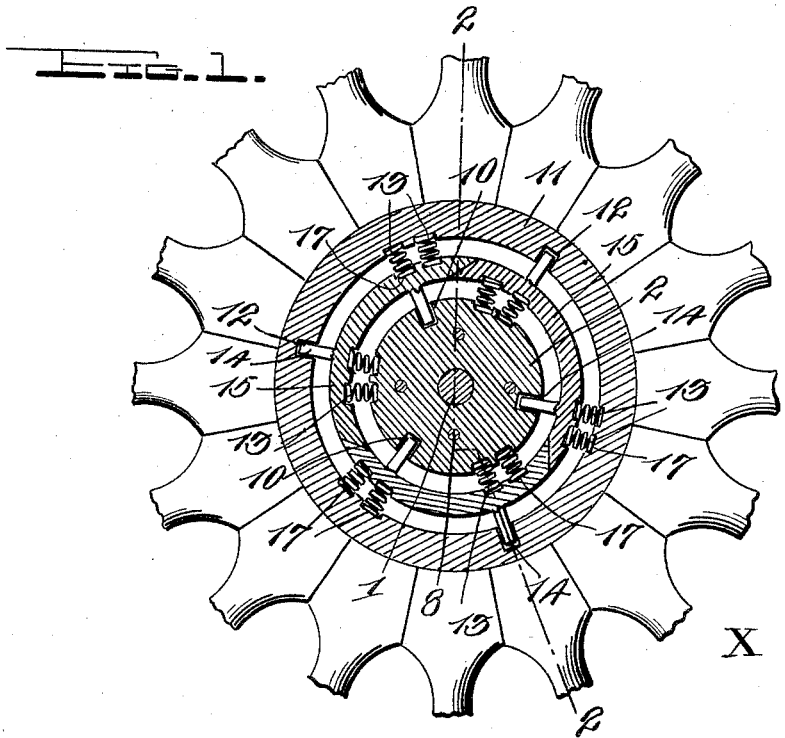
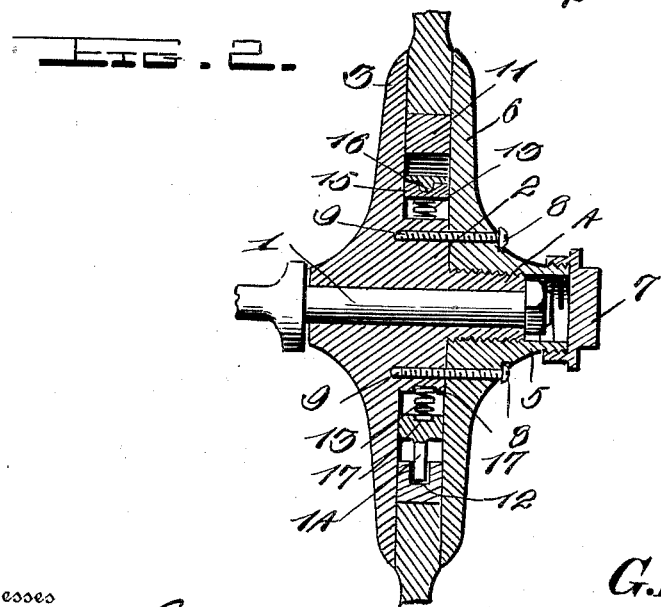

UNITED STATES PATENT OFFICE.

GEORGE HENRY HERRICK, OF FORT MADISON, IOWA.

SPRING-HUB FOR VEHICLE-WHEELS.

1,044,524.

Specification of Letters Patent.  Patented Nov. 19, 1912.

Application filed October 23, 1911.  Serial No. 656,134.

*To all whom it may concern:*

Be it known that I, GEORGE HENRY HERRICK, a citizen of the United States, residing at Fort Madison, in the county of Lee and State of Iowa, have invented certain new and useful Improvements in Spring-Hubs for Vehicle-Wheels, of which the following is a specification, reference being had to the accompanying drawings.

The object of my invention is to produce a wheel for vehicles whereby the jar in passing over rough or uneven roads will be lessened or prevented and the vehicle caused to run lighter and more steadily.

Another object of the invention is to provide a wheel of this character which will possess advantages in points of efficiency and durability, is inexpensive of manufacture and at the same time is simple in construction and operation.

The invention consists in providing the hub of the wheel with strong metallic springs, as hereinafter fully described.

With the above and other objects in view the invention consists in the novel features of construction and the combination and arrangements of parts hereinafter described, pointed out in the claims and shown in the accompanying drawings, in which, Figure 1 is a vertical longitudinal sectional view, and Fig. 2 is a vertical transverse sectional view.

Referring more particularly to the drawing 1 indicates the axle of a vehicle upon which is mounted the inner hub 2, said hub being provided with an outwardly projecting flange 3 and a reduced portion 4 is formed on said hub and extends to the outer end of the axle. Threaded on this reduced portion is the hub cap 5 having an outwardly projecting flange 6 formed integral therewith and a nut 7 threaded on the cap to keep the dust from entering the hub. This cap 5 is secured to the hub by means of the set screws 8 passing through the cap and threaded into the hub as shown at 9.

The outer periphery of the hub is provided with the recesses 10 and the inner periphery of the outer hub 11 is provided with the recesses 12, these recesses 10 and 12 being adapted to receive the oppositely disposed lugs 14 formed on the segmental ring 15. This ring 15 is disposed intermediate of the inner hub 2 and the outer hub 11 and is comprised of three sections having their ends secured by the tongue and groove connections 16.

Two sets of coil springs 13 are provided, one set being disposed at one end of the sections of the ring 15 and between the end of said sections and the outer hub, the other of said sets being disposed at the other end of the sections and between the end of said sections and the inner hub. The lugs 14 are formed on the inner and outer periphery of the sections of the ring 15 and opposite the sides engaged by the springs, so that the springs will keep the lugs 14 within the recesses 10 and 12 and thus when the wheel is rotated with the outer hub the inner hub is made to rotate upon the axle. The ring 15 and the inner and outer hubs are provided with the recesses 17 adapted to receive the ends of the coil springs 13 to hold said springs against lateral movement.

From the foregoing it will be seen that I have provided a novel wheel for vehicles whereby the jar in passing over rough or uneven roads will be lessened and the vehicle caused to run lighter and more steadily.

While I have shown and described the preferred form of my invention it will be obvious that various changes in the details of construction and in the proportions may be resorted to for successfully carrying my invention into practice without sacrificing any of the novel features or departing from the scope thereof.

Having thus described the invention, I claim:

1. In a vehicle wheel, the combination of an inner and outer hub, of a segmental ring, lugs formed integral with said ring and oppositely disposed on the inner and outer periphery thereof, said inner and outer hub being provided with recesses to receive said lugs, and coil springs between said ring and hubs and disposed opposite said lugs.

2. In a vehicle wheel, the combination of an inner and outer hub, of a sectional ring, lugs formed on the inner and outer periphery thereof and alternately disposed, said inner and outer hub being provided with recesses to receive said lugs, coil springs arranged in pairs between said inner hub and ring and between said outer hub and ring, the springs between the inner hub and ring being arranged opposite the lugs on the outer periphery of said ring, and the springs between the outer hub and ring being arranged opposite the lugs on the inner periphery of said ring.

In testimony whereof I hereunto affix my signature in the presence of two witnesses.

GEORGE HENRY HERRICK.

Witnesses:
THOMAS J. FARRELL,
WM. F. WILKEN.

Copies of this patent may be obtained for five cents each, by addressing the "Commissioner of Patents, Washington, D. C."